United States Patent Office 2,723,449
Patented Nov. 15, 1955

2,723,449

METHOD OF DIP BRAZING ALUMINOUS METAL MEMBERS

Mike A. Miller, New Kensington, Pa., assignor to Aluminum Company of America, Pittsburgh, Pa., a corporation of Pennsylvania No Drawing. Application April 23, 1954,
Serial No. 425,065

6 Claims. (Cl. 29—494)

This invention relates to methods of dip brazing aluminous metal, in which assemblies of aluminous metal members and filler metal in brazeable relationship are brazed by immersion in a molten salt bath. As used herein, the phrase "aluminous metal" includes aluminum of various grades and aluminum base alloys. The invention includes dip brazing aluminous metal in molten salt baths similar to those described in my prior application, Serial No. 307,383, filed August 30, 1952, whether or not the bath activating methods described therein are also employed to some extent.

In dip brazing aluminous metal the members to be joined are assembled in the desired structural relationship to each other with a suitable filler metal provided at the joint or joints, and the assembly is immersed in a molten salt bath maintained at a temperature above the liquids of the filler metal but below the solidus of the structural members. The salt bath serves both to heat the assembly to the brazing temperature and promote the flow of filler metal. The salt baths used heretofore have contained active flux salts in sufficient amounts to cleanse the surfaces of the structural members so that they may be "wetted" by the filler metal and to assist in the spread of the filler metal in the joint area. The base or major portion of such salt baths has generally consisted of two or more alkali metal chlorides, and the active flux portion has been composed of other halides, especially the fluorides of alkali metals and aluminum. In particular, lithium halides have been included in nearly all commercial brazing baths because they not only reduce the melting point of the salt mixtures but they have a very desirable effect on the flow of molten brazing alloy on the aluminous metal surface. Baths containing little or no lithium halides have been regarded as inferior and unreliable, yet lithium salts are relatively expensive and, at times, are difficult to obtain.

One difficulty associated with the dip brazing process has been the loss of bath components by decomposition of one or more of the components by hydrolysis or other reactions, and an economic loss that is always suffered is that which occurs by reason of the drag-out of molten bath clinging to the brazed members when withdrawn from the bath. The decomposition is influenced by the amount of water present in the bath and the nature of the components employed, some being more greatly affected by water than others. The presence of some water is unavoidable, it being introduced by fresh salt additions, by the parts being brazed or merely by exposure of the salt bath to the atmosphere. Thus, even though a salt mixture might be completely anhydrous when first melted, it quickly picks up some moisture which reacts with one or more of the salts. The reaction not only causes a loss of individual salts but creates an undesirable sludge that must be removed eventually. Obviously, the losses from decomposition and drag-out are of greater economic importance where the flux contains relatively costly material, such as lithium-containing compounds. Up to the present time it has not been found possible to use, in the ordinary way, a dip brazing bath composed almost entirely of low cost halides because such baths either do not clean and flux the aluminous metal surface, have such a short life as to be of no practical value in plant operations, or are very sensitive to the adverse effect of impurities.

It is an object of this invention to provide a method of dip brazing aluminuous metal in salt baths composed entirely or for the most part of salts which have little or no inherent fluxing action on the metal surface. Another object is to provide a method of activating a salt bath which is otherwise substantially devoid of ability to flux an aluminous surface. Still another object is to provide a method of dip brazing aluminous metal in a salt bath activated by a new means but which permits use of the dip brazing techniques of the prior art. A further object is to provide a method of dip brazing in a bath which is substantially free from sludge formation resulting from hydrolysis of salt components, even though substantial amounts of readily hydrolyzable salt components are contained therein. Still another object is to provide a flux bath which contains a very small amount of lithium salts, or even none at all, and yet has a sufficient degree of activity for dip brazing purposes.

These and other objects are attained in whole or in substantial part by dip brazing aluminous metal in a low melting point salt bath, the nature and relative amounts of the components of which are defined more fully hereinbelow, where the bath has been activated as a flux by electrolyzing the bath by passing a direct electric current therethrough which liberates nascent chlorine therein. I have found that nascent chlorine liberated in the bath effectively activates the flux, whereas bubbling chlorine gas through the bath is ineffective for this purpose. Only a very small direct current is necessary to activate the bath. Salt baths that contain little or no lithium salts, when treated in this manner, have been found to possess, in a high degree, the characteristics of prior art flux baths, which included large amounts of lithium compounds. In addition, it has been discovered that baths activated in this manner inhibit sludge formation arising from hydrolysis of salt components. The nascent chlorine need not be liberated at or near the surface of the aluminous metal being brazed, so long as it generated within the bath by electrolysis. It is dissolved, sorbed or otherwise held by the fused salt and appears to establish what I believe to be a non-oxidizing condition as opposed to an oxidizing condition. An oxidizing condition is considered to exist when the surfaces of the aluminum parts become coated with an oxide film which prevents brazing.

The salt bath, referred to above, should have as its essential components from 2 to 70% by weight of at least one salt of the group consisting of the chlorides of beryllium, magnesium, calcium, strontium and barium, these being hydrolyzable chlorides, and from 30 to 80% of at least one salt from the group consisting of the chlorides of sodium and potassium, these being the common alkali metal chlorides, the total amount of all of the hydrolyzable and common alkali metal chlorides constituting at least the major portion of the bath.

To obtain the desired characteristics in the bath it is necessary, as mentioned above, to include at least one salt of the group consisting of beryllium chloride, magnesium chloride, calcium chloride, strontium chloride and barium chloride. These salts hydrolyze in contact with minute amounts of water present in the bath and probably tend to form an oxide or an oxyhalide or perhaps some other oxygen-containing products. Formation of such products is inhibited by the small amount of nascent chlorine generated in the bath by passing a direct current therethrough. The precise manner in which these chlorides function and the part the products of hydrolysis play in the flux is not clearly understood, but it has been ascertained that at least one of these chlorides is essential in salt fluxes activated in accordance with the invention. The proportion of hydrolyzable chloride to be used will vary with the number selected and with the alkali metal chloride with which it is associated, and it is desirable that the total amount of hydrolyzable chloride be within the range of 20 to 70% of the weight of the flux bath. Calcium chloride is a cheap and otherwise suitable hydrolyzable chloride to use, and especially where other components than calcium chloride and alkali metal chloride are used it is preferable to employ it in a range from 20 to 40%. Where strontium chloride is employed, it is preferable to employ it in a range of 2 to 15%. Where one or more of the remaining hydrolyzable chlorides is used, from 10 to 30% is preferred. Strontium chloride has the special effect of promoting flow of the fused filler metal between the metal members being brazed and hence it is frequently desirable to include a small amount of this salt in the flux, especially if no lithium chloride is employed.

The alkali metal chloride portion of the bath should be selected with a view to the melting point of the salt mixture. Sodium and potassium chlorides are considered to be neutral components inasmuch as they have no fluxing action, but both may be used in providing a relatively low melting point bath. Lithium chloride, while not specifically essential, may be used along with the common alkali metal chlorides since it definitely improves the flow of fused filler metal when used in a salt bath activated in accordance with the invention. Although amounts up to as much as 25% may be used effectively, I have found that very satisfactory bath compositions can be formulated for activation in accordance with the invention which contain from 0.2 to 5% of this chloride, and preferably less than 2%. The common alkali metal chlorides may be employed in amounts up to 80% each, the total preferably being within the range 50 to 80% when more than one is used. In my preferred compositions the portion of the bath composed of both the hydrolyzable and alkali metal chlorides preferably constitute at least 90% of the entire composition. Of all the alkali metal chlorides those of sodium, and potassium are preferred, and for purposes of this invention are regarded as constituting a group of related salts.

Along with the salts so far mentioned, the bath may also, and preferably does, contain from 0.5 to 10% of at least one salt of the group consisting of the fluorides of beryllium, magnesium and aluminum and the double fluorides of aluminum and the alkali metals. The double fluorides of aluminum and sodium, for example, include the substances known as cryolite and chiolite. If the double fluorides are not available alkali metal fluoride and aluminum fluoride may be added to the bath in the proportions necessary to form a double fluoride. From the standpoint of cost, aluminum fluoride or the double aluminum fluorides are preferred as bath components of this group. All of the foregoing fluorides have a beneficial action in preparing the aluminous metal surface for brazing and in their absence the action of the bath is slower. They also appear to undergo some degree of hydrolysis as do the chlorides of the group mentioned above and with similar advantages to the performance of the bath activated in accordance with the invention. In the preferred practice, fluoride is used in amounts of 2 to 5%.

In general the salt bath should have a liquidus no higher than 1100° F., in order to have a bath which possesses high fluidity and which will minimize drag-out. Ordinarily a melting point range of between 900 and 1100° F. will be found to be quite satisfactory.

The following are a few examples of lithium-free and low lithium salt baths useful in accordance with the invention, the proportions being expressed in percentage by weight.

| (1) | (2) | (3) |
|---|---|---|
| 35 NaCl | 0.5 LiCl | 15 NaCl |
| 65 CaCl$_2$ | 22 NaCl | 41 KCl |
|  | 46 KCl | 30 CaCl$_2$ |
|  | 29 CaCl$_2$ | 6 SrCl$_2$ |
|  | 2.5 Na$_3$AlF$_6$ | 8 Na$_3$AlF$_6$ |

The molten salt baths described are all either inert from the standpoint of fluxing aluminous metal for brazing or, at best, only moderately active for short periods, until they are activated as by the procedure now to be described. I have discovered that brazing of aluminous metal may be periodically and repeatedly effected in a molten bath of the character described if it is activated as a flux by at least periodically passing direct current through the bath. The direct current may be caused to flow at intervals or continuously, its magnitude and duration being adjusted to liberate nascent chlorine in the bath as the activating agent.

A convenient method of introducing the current is to connect a small direct current source to two aluminum electrodes immersed in the bath, but electrodes made of other material not introducing harmful impurities may also be employed. It is preferable to keep the anode current density in the range between 0.05 and 1 ampere per square inch, but higher current densities may be employed. I have found a current of a magnitude at least on the order of 0.01 ampere per pound of bath to be desirable, but it is usually not necessary to employ a current greater than 0.1 ampere per pound, not to maintain the current continuously. In fact, current flow during ½ to 2 hours per day has been found sufficient where a bath was being used 8 hours per day.

In a particular form of the invention, the aluminus metal of the assemblies being brazed is made anode in the salt bath. In this case it is especially desirable to employ a low anode current density, e. g. of 0.05 to 1 ampere per square inch of aluminous metal surface, and preferably about 0.25 ampere per square inch. Making the work anode is very effective since the nascent chlorine from electrolysis is generated right at the surfaces to be brazed, and the aluminum oxide film on such surfaces is readily removed. This form of the invention is, however, sometimes objectionable because of a tendency to etch the aluminous surfaces exposed outside the joint or joints, although the etched conditions can be eliminated quite simply by subsequent surface treatments that may be required in any event. A further observation concerning this form of the invention is that a "foam" sometimes builds up on the parts being brazed. This condition can readily be minimized by shutting off the current prior to removal of the assembly from the bath, and the foam can be eliminated by a mere momentary reversal of the current.

In addition to activating a salt bath as a flux, the introduction of a direct current has additional advantages. It electrolyzes any water in the bath and plates out any heavy metal impurities. Therefore, less care need be taken to avoid slight water contamination or the introduction of small amounts of heavy metal. However, the current flow must be continued so as to generate nascent chlorine in the bath in order to activate, as an aluminous metal flux, a bath not otherwise having flux properties.

The procedures so far described may advantageously be used in connection with baths treated to some extent by the procedures described in my prior application above-mentioned, wherein the salt bath is treated with at least one anhydrous hydrohalide of the group consisting of hydrogen fluoride and hydrogen chloride, these being gaseous at the salt bath temperature and ordinary pressure and providing hydrohalide in the bath. When a direct current is employed to activate a hydrohalide treated bath, the extent of the hydrohalide treatment and the magnitude and duration of the current flow may be adjusted so that either treatment, or both, may be less rigorous or prolonged. In other words, baths treated with hydrohalide either to an extent insufficient to activate the same, or which fail to maintain their activity through use or otherwise, are readily amenable to activation by the direct current treatment described herein.

The direct current activation may be applied to a bath previously treated with hydrohalide or it may be effected conjointly with the introduction of hydrohalide, if desired. Direct current activation of a hydrohalide treated bath is especially effective for producing satisfactory brazing response over extended periods of time at low cost. The hydrohalide treatment may consist in periodically introducing hydrohalide in a small amount up to that required to saturate the molten salt bath. By "saturation" I mean the maximum capacity of the fused salt for holding the hydrohalide, both chemically and physically. At present there is no known means of ascertaining the actual amount of hydrohalide, short of saturation, which is present at any given time.

As indicated hereinabove, the hydrohalides which may be used are anhydrous hydrogen chloride and hydrogen fluoride. The other hydrohalides, hydrogen iodide and hydrogen bromide, probably decompose at the temperature of the fused salt, but in any event, they are ineffective in preparing the salt baths for brazing purposes. Of the two useful hydrohalides, hydrogen chloride is preferred because of its low cost and because it gives rise to very little fume. It is essential, in any case, to use the dry gas to avoid an excess of water in the flux. Although the two anhydrous hydrohalides may be used separately it may be advantageous to use them jointly. Furthermore, it is possible to dilute the hydrohalide with a suitable inert gas such as helium, argon and even nitrogen.

In general, it may be desirable to introduce a small amount of gaseous hydrohalide regularly, for example, for a half hour or so per day. A period of time is necessary to allow the gas to permeate the liquid salt and aid in establishing the non-oxidizing condition required for brazing. A slow rate of introduction has been found to be most suitable. Whenever the desired hydrohalide treatment condition has been achieved a lower flow rate can be used or none at all. In general, an initial flow of 0.02 to 1.0 cc. per minute at 14.7 p. s. i. absolute pressure and 70° F. of anhydrous hydrohalide gas per pound of flux is recommended. The flow rate and period of treatment in any given case will, of course, vary with the extent of the direct current treatment, the size of the bath being treated, and the utilization of the bath for brazing.

Anhydrous hydrohalide may be introduced into the molten salt bath in any suitable manner either from a source of compressed gas or from a gas generator. The gas may be passed into a perforated pipe or a porous cup held near the bottom of the bath and allowed to slowly bubble through the salt bath. Other known means of contacting a liquid with a gas may be employed if adapted to operate in a fused salt environment. A perforated pipe or porous cup has the advantage of dividing the gas into small streams of bubbles and thereby obtaining better contact between the gas and the salt. Also, such a gas distributing means can be readily removed from the fused salt bath when desired. Instead of introducing the hydrohalide gas from an external source, it is possible to use decomposable halides which yield no undesirable residue. Such substances as ammonium chloride may be employed.

The customary procedures followed in dip brazing with conventional flux baths can be used in employing the salt bath, activated in accordance with the invention. That is, substantially the same bath temperature ranges and periods of immersion may be employed as have been utilized in prior practice for brazing the same type of article. To secure the best results, however, it is preferable to use slightly higher temperatures than might normally be employed. The employment of the same procedures is of considerable practical advantage for it means that my activated salt bath can be substituted for conventional baths without altering the plant practice to any significant extent.

The aluminous metal to be brazed may be of any shape or size which will permit assembly and immersion in the salt bath. The filler metal may be provided in the form of wire, strip or stampings which are placed at the location of the joints prior to brazing or it may be supplied as a coating on a sheet as shown in United States Patent 2,312,039 or as an intermediate layer in a composite sheet product such as illustrated in United States Patent 2,602,413. The composite sheet products having a coating or intermediate layer of brazing alloy are commercially referred to as brazing sheets. This material is very well adapted to the production of brazed articles and has been found to be especially suited to the production of dip brazed products.

The filler or brazing alloy may be any one of the commonly used compositions. Aluminum-silicon alloys containing from 2 to 12% silicon are very satisfactory as well as those aluminum-silicon type alloys which contain from 2 to 5% copper and/or 7 to 12% zinc. The choice of brazing alloy will be determined, in part, by the temperature at which brazing is done; in general, those alloys having the largest amounts of added elements being useful at lower brazing temperatures than those compositions having a smaller amount of added components.

In order to insure operation of a salt bath at its highest efficiency, if the bath is not initially electrolyzed, it is ordinarily necessary to purify the molten mixture prior to dip brazing by suspending pieces of aluminum in the bath for a period of time. In commercial operations, this is usually done by suspending coils of aluminum wire or strip in the bath for a number of hours during the period of melting and bringing the bath up to brazing temperature. If the bath remains idle for some time, even though in molten condition, it has sometimes been necessary to repeat the treatment with aluminum before brazing is attempted. The treatment appears to remove excess water and metallic impurities which may be associated with the salts or derived from the container or heating elements submerged in the bath.

However, with the use of a direct current in accordance with the invention, the above-described dehydrating step may be eliminated, if desired, as the current electrolyzes the water content of the bath. The hydrohalide treatment is also effective in removing water by entrainment, but is most effective for actually reversing decomposition by hydrolysis and thus keeping the bath acid.

As an example of a particular form of the invention described, T joints between members of an aluminum alloy containing 1.2% manganese, employing shims of an aluminum brazing alloy containing 10% silicon as filler metal, were made in bath (1) identified above, by immersing the assemblies and making them anode in the bath at a current density of 0.16 ampere per square inch for 4 minutes at 1100 to 1120 F. The current flow per pound of bath was approximately 0.08 ampere.

As an example of another form of the invention, double T joints between two pieces of aluminum alloy containing 1.2% manganese and one piece of aluminum brazing sheet having on one side thereof a coating of aluminum brazing alloy containing 5% silicon providing filler metal, were brazed in bath (3) identified above, by immersing the assemblies in a previously electrolyzed bath for a few minutes at 1100° F. Separate aluminum alloy electrodes were employed to introduce a continuous current of approximately 0.025 ampere per square inch of electrode surface. The current flow per pound of bath was approximately 0.01 ampere.

As an example of the form of the invention in which the direct current is applied to a hydrohalide treated bath, numerous aluminous metal assemblies, similar to those of the other examples, were brazed, from day to day throughout an 8 hour shift, in bath (3) identified above, by immersing the assemblies in the bath for a few minutes at about 1100° F. The bath was treated daily for about one-half hour with hydrogen chloride at the rate of about 1 cc. per minute per pound of bath. Separate aluminum electrodes were employed to introduce a current of approximately 0.5 ampere per square inch of electrode surface. The current flow per pound of bath was approximately 0.05 ampere. However, the current was employed for only an hour or two each day.

Having thus described my invention and certain embodiments thereof, I claim:

1. A method of dip brazing aluminous metal comprising periodically immersing assemblies of aluminous metal members and filler metal in brazeable relationship in a molten salt bath having as its essential components from 2 to 70% by weight of at least one salt of the group consisting of the chlorides of beryllium, magnesium, calcium, strontium and barium, and from 30 to 80% of at least one salt from the group consisting of the chlorides of sodium and potassium, the total amount of all of said chlorides constituting at least the major portion of the bath, and activating the bath as a flux for brazing the immersed assemblies by at least periodically electrolyzing the bath by passing direct current through the bath, the magnitude and duration of current flow being adjusted to liberate nascent chlorine in the bath.

2. A method of dip brazing aluminous metal comprising periodically immersing assemblies of aluminous metal members and filler metal in brazeable relationship in a molten salt bath having as its essential components from 20 to 40% by weight of calcium chloride, from 2 to 15% strontium chloride, and from 50 to 80% sodium and potassium chlorides combined, and also containing from 0.5 to 10% of at least one salt of the group consisting of aluminum fluoride and the alkali metal aluminum fluorides, and activating the bath as a flux for brazing the immersed assemblies by at least periodically electrolyzing the bath by passing direct current through the bath, the magnitude and duration of current flow being adjusted to liberate nascent chlorine in the bath.

3. A method of dip brazing aluminous metal comprising periodically immersing assemblies of aluminous metal members and filler metal in brazeable relationship in a molten salt bath having as its essential components from 20 to 40% by weight of calcium chloride, and from 50 to 80% sodium and potassium chlorides combined, and also containing from 0.2 to 5% lithium chloride and from 0.5 to 10% of at least one salt of the group consisting of aluminum fluoride and the alkali metal aluminum fluorides, and activating the bath as a flux for brazing the immersed assemblies by at least periodically electrolyzing the bath by passing direct current through the bath, the magnitude and duration of current flow being adjusted to liberate nascent chlorine in the bath.

4. A method according to claim 1 in which the current is of a magnitude at least on the order of 0.01 ampere per pound of bath.

5. A method according to claim 1 in which the current is provided by making the assemblies anode in the bath at a current density of 0.05 to 1 ampere per square inch of aluminous metal surface.

6. A method of dip brazing aluminous metal comprising perodically immersing assemblies of aluminous metal members and filler metal in brazeable relationship in a molten salt bath having as its essential components from 2 to 70% by weight of at least one salt of the group consisting of the chlorides of beryllium, magnesium, calcium, strontium and barium, and from 30 to 80% of at least one salt from the group consisting of the chlorides of sodium and potassium, the total amount of all of said chlorides constituting at least the major portion of the bath, the bath also having been treated with at least one anhydrous hydrohalide of the group consisting of hydrogen fluoride and hydrogen chloride, and activating the bath as a flux for brazing the immersed assemblies by at least periodically electrolyzing the bath by passing direct current through the bath, the magnitude and duration of current flow being adjusted to liberate nascent chlorine in the bath.

References Cited in the file of this patent

UNITED STATES PATENTS

| | | |
|---|---|---|
| 1,519,128 | Gann | Dec. 16, 1924 |
| 1,524,268 | McNitt | Jan. 27, 1925 |
| 1,941,750 | Johansson | Jan. 2, 1934 |
| 2,101,553 | Mattsson | Dec. 7, 1937 |
| 2,182,364 | Smith | Dec. 5, 1939 |
| 2,239,018 | Rogerson | Apr. 22, 1941 |
| 2,396,604 | Reimers | Mar. 12, 1946 |
| 2,497,539 | Emley et al. | Feb. 14, 1950 |
| 2,507,346 | Miller | May 9, 1950 |
| 2,569,097 | Grange et al. | Sept. 25, 1951 |
| 2,671,040 | Holmes | Mar. 2, 1954 |
| 2,674,790 | Edson et al. | Apr. 13, 1954 |

FOREIGN PATENTS

| | | |
|---|---|---|
| 19,942 | Great Britain | 1890 |